June 5, 1962

G. LARSON

SPRING CLIP

Original Filed March 1, 1956

Re. 25,182

INVENTOR.
GUSTAV LARSON
BY Edward M. Apple
ATTORNEY

United States Patent Office

Re. 25,18

Reissued June 5, 196

25,182

SPRING CLIP

Gustav Larson, Detroit, Mich., assignor to Helm Accessories, Inc., a corporation of Michigan Original No. 2,792,654, dated May 21, 1957, Ser. No. 568,752, Mar. 1, 1956. Application for reissue June 9, 1958, Ser. No. 740,985

3 Claims. (Cl. 40—209)

Matter enclosed in heavy brackets [ ] appears in the original patent but forms no part of this reissue specification; matter printed in italics indicates the additions made by reissue.

This invention relates to fastening devices, and has particular reference to a spring clip, for use in detachably securing two elements together, and has particular reference to a spring clip for use in securing a frame to a conventional automobile license plate.

An object of the invention is to generally improve fastening devices of the character indicated, and to provide a spring clip which may be economically manufactured and assembled with other elements.

Another object of the invention is to provide a spring clip, which is constructed and arranged, so that a marginal element, such as a frame may be detachably secured to any plate-like elements, having a variety of thicknesses, without the necessity of doing any work on the plate like element such as machining, drilling holes therein, or otherwise defacing the plate.

Although I have herein disclosed the use of the spring clip for the purpose of attaching a frame to a license plate, it will be understood that it could be used with equal facility in securing a glass in a picture frame, and the like.

The foregoing and other objects and advantages of the invention will become more apparent as the description proceeds, reference being made from time to time to the accompanying drawing forming part of the within disclosure, in which drawing.

Figure 1:
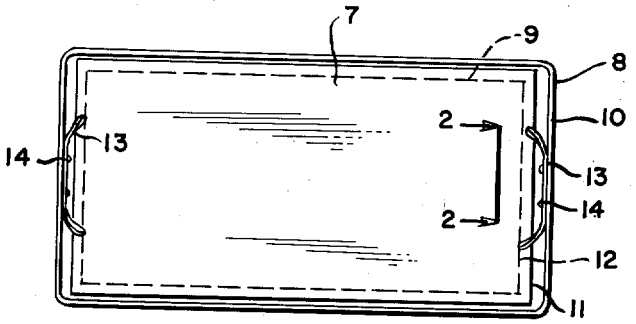
FIG. 1 is a plan view of the rear of an automobile license plate and frame combination, which employs as the fastening means the spring clip embodying the invention.
Figure 3:
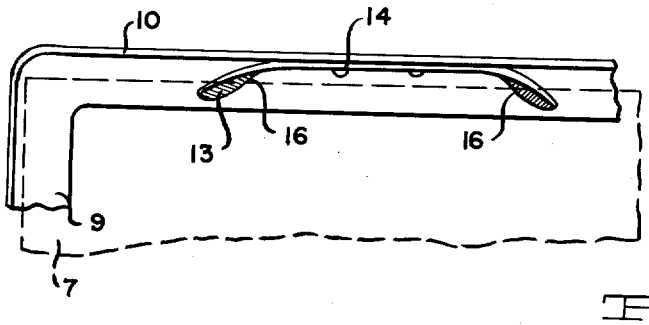
FIG. 3 is an enlarged, fragmentary, plan view, looking in the direction of the arrow 3 in FIG. 2.
Figure 4:
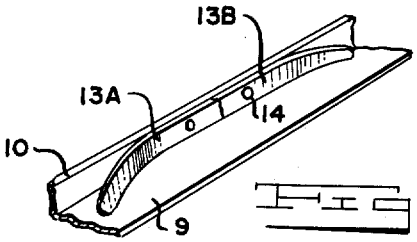
FIG. 4 is a modified form of the spring clip.

Referring now more particularly to the drawing, it will be understood that in the embodiment herein disclosed, the reference character 7 indicates a conventional automobile license plate to which is detachably mounted a marginal frame 8, which is substantially L shaped in cross section, the long leg 9 of the L being disposed in a horizontal plane and the short leg 10 of the L being disposed in a vertical plane. It will be noted, as at 11, that the edges of the license plate 7 overlie the inside edges 12 of the frame 8, and the ends of the spring clip 13 overlie the ends of the license plate 7, exerting pressure thereon, to gently urge the license plate into close contact with the leg 9 of the frame. The spring clips 13 are secured to the short leg 10, of the frame, by any suitable means, such as rivets 14. Although I have show the spring clips 13, in FIGS. 1 to 3, as being made in on piece, it will be understood that they may be made i halves 13A and 13B, as shown in FIG. 4.

Figure 2:
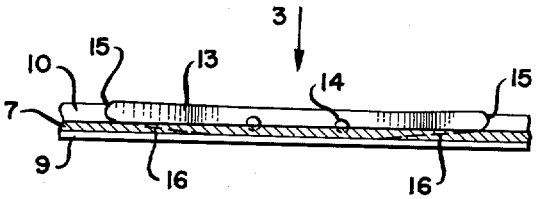
FIG. 2 is a fragmentary section, taken substantially on the line 2—2 of FIG. 1.

Each spring clip 13 is preferably stamped from a she of metal, formed, and then heat treated. In the stampin and forming process, the ends 15 are preferably rounde The edges 16 are inclined as shown in FIG. 2, and th sections having the inclined edges 16, are slightly twiste about their longitudinal axes, to provide a varying d gree of pitch. This permits the spring clips 13, to be use with plates 7, having different thicknesses, without var ing the tension of the springs, or distorting their norm shape.

It is believed that the operation of the device is o vious from the foregoing description.

Having described my invention, what I claim and d sire to secure by Letters Patent is:

[1. A spring clip, comprising a rectangular length metal, having at least one inclined, longitudinal edge, an having the inclined edge portion slightly twisted about i longitudinal axis to provide varying degrees of pitch.

2. A spring clip, comprising a rectangular length spring metal, with rounded ends, an inclined longitudin edge adjacent to each rounded end, the inclined long tudinal edge portions being slightly twisted about the longitudinal axes, to provide varying degrees of pitch.

3. In combination, a plate-like member, a frame, ar means for detachably securing the plate and frame t gether, said means comprising one or more spring clip each consisting of a length of metal, having an incline lower longitudinal edge *disposed adjacent the plane said plate,* said length of metal being twisted about portion of its longitudinal axis *and along said incline longitudinal edge* to provide an area of variable pitc

*4. In combination, a frame member having a surfa against which a plate member is adapted to be supporte and means for supporting a plate member against sa surface comprising a clip consisting of a length of met mounted on said frame so that the plane of the clip generally perpendicular to the plane of the frame membe said clip having a free end portion and a longitudin edge portion adjacent said surface of the frame membe said longituidnal edge portion being inclined a materi distance from said free end portion toward the plane said frame member to permit insertion of said pla member between said surface and said inclined long tudinal edge of the clip, said clip member being bow in a longitudinal direction.*

References Cited in the file of this patent or the original patent

UNITED STATES PATENTS

| | | |
|---|---|---|
| 470,222 | Townsend | Mar. 8, 18 |
| 697,848 | Jarvis | Apr. 15, 19 |
| 1,289,377 | Brown | Dec. 31, 19 |
| 1,699,013 | Nelson | Jan. 15, 19 |
| 2,241,263 | Koppe | May 6, 19 |
| 2,450,330 | De Giers | Sept. 28, 19 |

FOREIGN PATENTS

| | | |
|---|---|---|
| 15,847 | Great Britain | May 6, 19 |
| 37,076 | Denmark | Jan. 21, 19 |